United States Patent [19]

Larson et al.

[11] 4,017,351
[45] Apr. 12, 1977

[54] SYSTEM AND DEVICE FOR INFLATING AND SEALING AIR INFLATED CUSHIONING MATERIAL

[75] Inventors: Curtis L. Larson, Hudson, Wis.; John R. Ward, St. Paul, Minn.

[73] Assignee: Minnesota Mining and Manufacturing Company, St. Paul, Minn.

[22] Filed: Dec. 24, 1975

[21] Appl. No.: 644,047

[52] U.S. Cl. .............................. 156/494; 156/145; 156/147; 156/497; 156/498
[51] Int. Cl.² ....................................... B32B 31/00
[58] Field of Search .......... 156/145, 146, 147, 285, 156/292, 497, 498, 494; 264/96, 173

[56] References Cited

UNITED STATES PATENTS

| | | | |
|---|---|---|---|
| 2,470,990 | 5/1949 | Kennedy | 156/145 |
| 3,660,189 | 5/1972 | Troy | 156/145 |
| 3,865,667 | 2/1975 | Ferrari | 156/285 |
| 3,868,285 | 2/1975 | Troy | 156/147 |
| 3,938,298 | 2/1976 | Lohman et al. | 156/147 |

Primary Examiner—Caleb Weston
Attorney, Agent, or Firm—Alexander, Sell, Steldt & DeLaHunt

[57] ABSTRACT

An improved system and a device for providing air inflated cushioning material which is filled and sealed at the site of its intended use, such as at a packaging line. Included is an elongate flexible layered strip material comprising two heat sealable films fused together in discrete areas to form two rows of inflatable chambers along the strip and a passageway extending the length of the strip between the rows, with each of the chambers having an inlet opening narrower than the main portion of the chamber communicating with the passageway. The strip is shipped uninflated to the site where the cushioning material is to be used, and is then inflated on the device through which the passageway in the strip is propelled over an air nozzle to inflate the chambers through their inlet openings. The device heat seals the inlet openings after first pressing together and tensioning the films around the area to be sealed to both insure a wrinkle free seal and insure that air pressure in the chamber will not rupture the sealed area while it is hot.

14 Claims, 10 Drawing Figures

SYSTEM AND DEVICE FOR INFLATING AND SEALING AIR INFLATED CUSHIONING MATERIAL

BACKGROUND OF THE INVENTION

1. Field of the Invention

The present invention relates to systems including a strip material of the type having chambers formed between two heat sealable films and a device for filling and sealing the chambers of the strip material to form air cushioning material.

2. Description of the Prior Art

U.S. Pat Nos. 3,660,189 and 3,868,285 describe systems and devices for providing air cushioning material in which (1) an elongate strip material is prepared by fusing together two flexible heat sealable films in discrete areas to define a plurality of chambers between the films with each chamber having an inlet opening; (2) the strip material is shipped to the site of its intended use; and (3) a device is then used to inflate and seal the chambers to form air cushioning material. This type of system reduces bulk handling problems and the costs of shipping air which would otherwise result if the strip material were inflated and sealed at a central production facility and was then shipped in an inflated condition to the site of its intended use. The chambers formed prior to inflation in the systems of U.S. Pat. Nos. 3,660,189 and 3,868,285, however, extend transversely nearly across the strip material. Each chamber has at least one end which is open across the entire width of the chamber to provide the inlet opening and is positioned adjacent a longitudinal edge of the strip material. The strip material is moved to sequentially position the open ends of the chambers adjacent to a nozzle through which air flows to inflate the chambers, and the device must then perform extensive heat sealing operations both to seal across the open ends of the chambers, and to divide the chambers longitudinally of the strip material into smaller chambers of a more suitable size. Because of the large number of seals that must be made, the filling and sealing device is more complex and expensive than might be desired to afford the use of such a system by a small manufacturing facility. Also, sealing across the full width of the inflated chambers causes wrinkles which tend to leak air through the sealed areas. This occurs because opposed arcuate lengths of each film are gathered and sealed together in about the length of their common cord.

SUMMARY OF THE INVENTION

The present invention provides an improved system of the aforementioned type which affords more complete preparation of chambers in a strip material at a central location and a simplified device for filling and sealing the chambers, and which effectively eliminates the forming of wrinkles when sealing inflated chambers.

In the system according to the present invention two films are fused together to provide a strip material defining between the films two rows of inflatable chambers and a passageway extending the length of the strip material between the passageways with each chamber having an inlet opening communicating with the passageway and the inlet openings for each row being aligned longitudinally of the strip material. The strip material is propelled along a path through the device with the passageway moving over a nozzle through which air or some other gas flows to inflate the chambers on both sides of the passageway, with one of the film portions defining the passageway being opened to afford such movement of the strip material over the nozzle. Sealing means in the device seals across the inlet openings to the inflated chambers longitudinally of the strip material along both sides of the passageway to complete the inflated cushioning material.

The inflatable chambers preferably have inlet openings with a dimension longitudinally of the strip material which is quite narrow compared to the width of the chambers in the corresponding direction, and the device includes means for tensioning the strip material in the longitudinal direction and for pressing the films of the strip material together over the narrow inlet openings as the inlet openings are sealed to preclude wrinkles in the resulting seal.

When chambers having an inlet opening with the same dimension longitudinally of the strip material as the width of the chambers in the corresponding direction (e.g. one inch) have been sealed on the device, occasional wrinkling and leaking of the chambers has resulted. Such wrinkling and leakage is essentially eliminated, however, when the dimension of the inlet opening longitudinally of the strip material is less than one-half the width of the chambers longitudinally of the strip material. Under these conditions, the sealed together portions of the films aligned with the inlet openings to the chambers add rigidity which helps reduce lengthwise shrinking of the film across the inlet openings under the influence of air pressure in the chambers and which allows the films at the inlet openings to be more easily tensioned to a wrinkle free condition. Additionally, the use of inlet openings having a reduced dimension longitudinally of the strip material as compared with the corresponding dimension of the chamber affords the use of generally arcuate sealing lines around the junction between the inlet opening and the chamber, thereby eliminating stress concentration points and maximizing the bursting strength of the chamber.

The inflatable chambers are elongate and are initially formed with constrictions along their lengths. These constrictions both (1) might preclude the need to seal the chambers into smaller chambers after inflation, thereby simplifying the device for sealing the chambers, and (2) define chamber portions interconnected by the constrictions which restrict air transfer between the portions of the inflated cushion to provide damping for the inflated chamber portions during use of the cushioning material.

The elongate chambers can extend with their center lines at a right or an acute angle to the center line of the passageway. Acute angles in the range of about 30 to 75 degrees afford close proximity of circular chamber portions of adjacent chambers to minimize the uninflated areas of the cushioning material. Also chambers so disposed can provide an advantage when the cushioning material is wrapped around an object and one chamber of the cushioning material ruptures, since the cushioning material will not have an uninflated area in a path normal to one of its edges which path often is aligned with an edge of a protected object.

Preferably the means in the device for sealing the heat fusible film includes a highly heat conductive endless belt having a contact surface adapted to releasably engage the film (e.g. a stainless steel belt having a "Teflon" coated contact surface). The belt is movably supported in the device with a length of its contact surface along a support surface defining a portion of the path for the strip material and is biased into contact with a length of the strip material along the support surface. The belt moves with the strip material as the strip material is propelled through the device, and the heat to seal the films together at the inlet openings to the chambers is applied from a stationary heated shoe through the moving belt contacting the film. This arrangement surprisingly only transfers sufficient heat to fuse the film in the area directly adjacent the shoe. The belt has a width wider than the shoe to press the films together both at and adjacent the fused area which not only helps to prevent wrinkles in the seal, but also prevents air pressure in the chambers or inlet opening adjacent the sealed area from rupturing the film along the fused area when the fused area is hot. Also the belt supports the fused films as they cool after they move from adjacent the heated shoe, which cooling is facilitated by a heat sink pressed against the belt adjacent the heated shoe.

Since the two rows of chambers are inflated from a central channel and the inflating and sealing means only engages the strip material around the passageway, the operation of the device is not adversely affected by shrinking of the strip material width which may occur during inflation of the chambers.

BRIEF DESCRIPTION OF THE DRAWING

The present invention will be more fully understood after reading the following detailed description which refers to the accompanying drawing wherein.

DESCRIPTION OF THE PREFERRED EMBODIMENT

Referring now to FIGS. 1 through 7 there is illustrated an inflation device for use in a system according to the present invention, generally designated by the numeral 10, which device 10 is adapted for inflating and sealing a preformed elongate layered strip material 12.

Figure 1:
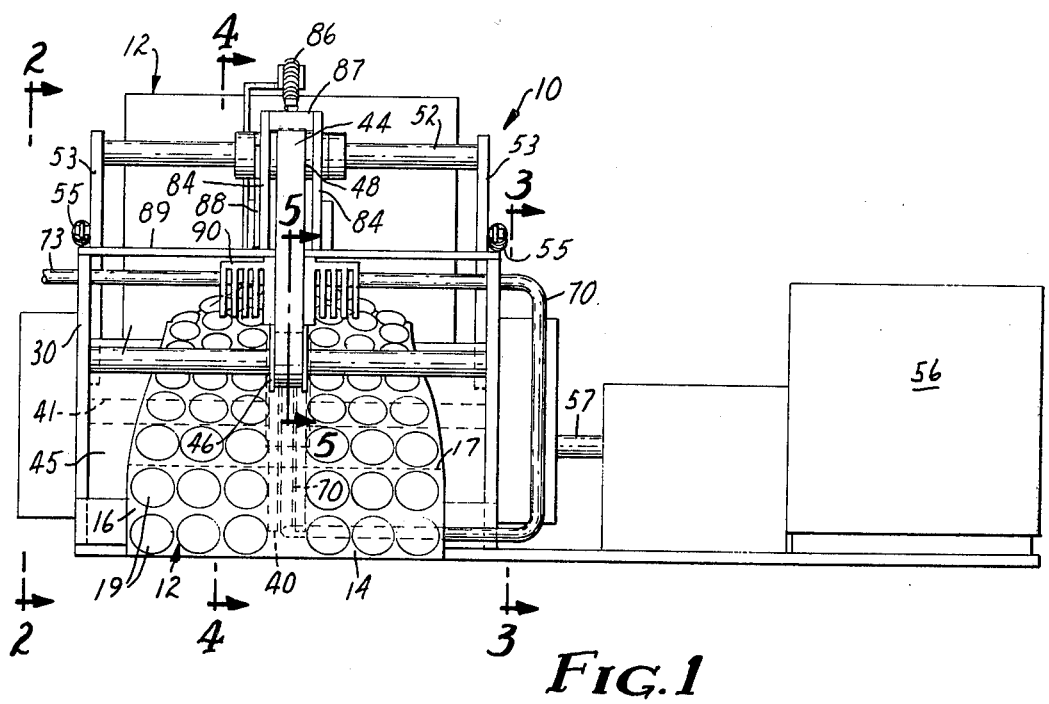
FIG. 1 is a vertical end view of an inflating device in the system according to the present invention.
Figure 2:
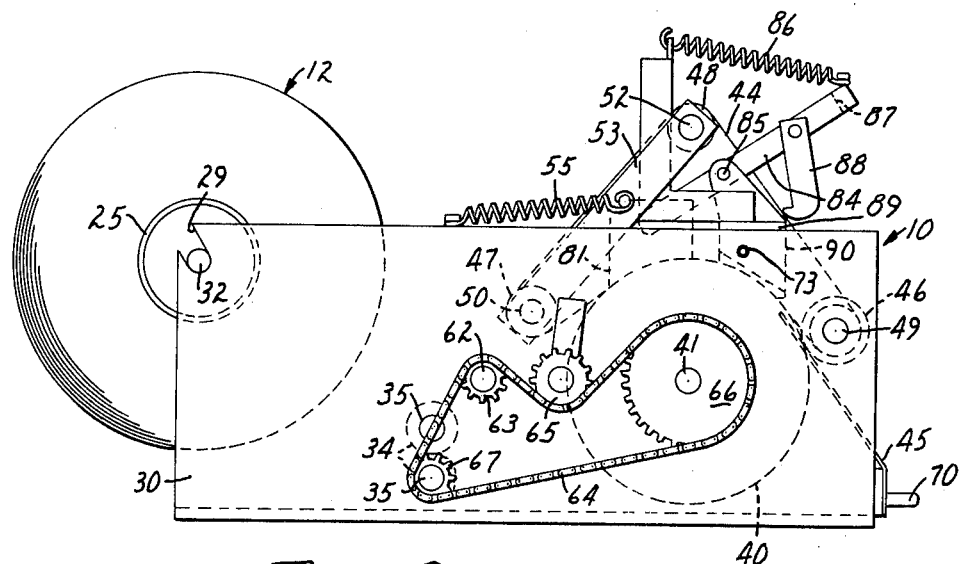
FIG. 2 is a sectional view taken approximately along line 2—2 of FIG. 1.
Figure 3:
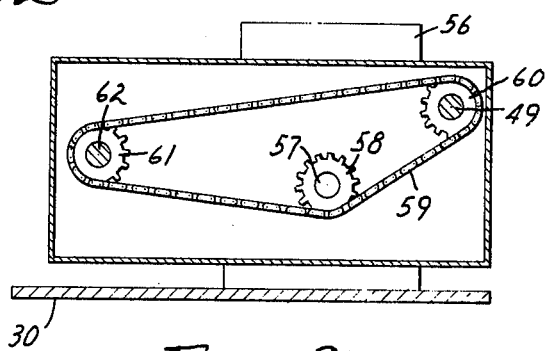
FIG. 3 is a sectional view taken approximately along line 3—3 of FIG. 1.
Figure 4:
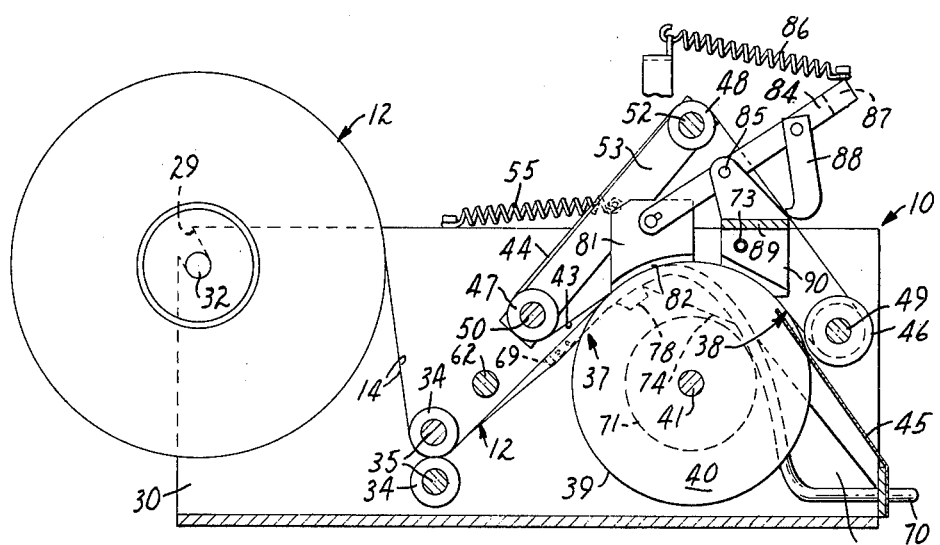
FIG. 4 is a sectional view taken approximately along line 4—4 of FIG. 1.
Figure 5:
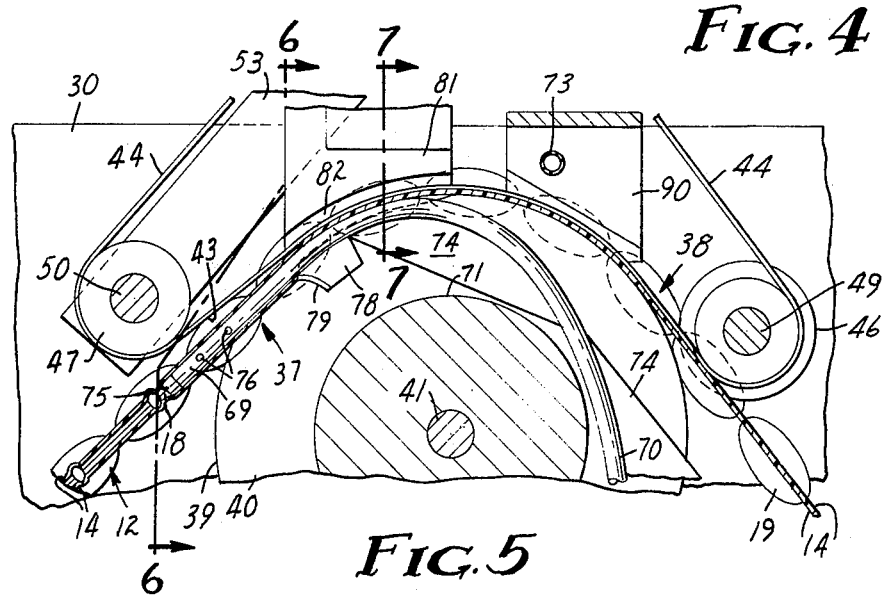
FIG. 5 is an enlarged fragmentary sectional view taken approximately along line 5—5 of FIG. 1.
Figure 6:
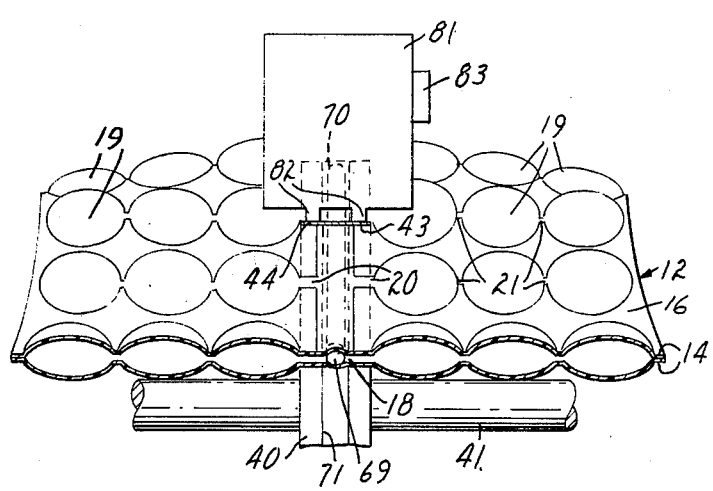
FIG. 6 is a sectional view taken approximately along line 6—6 of FIG. 5.
Figure 8:
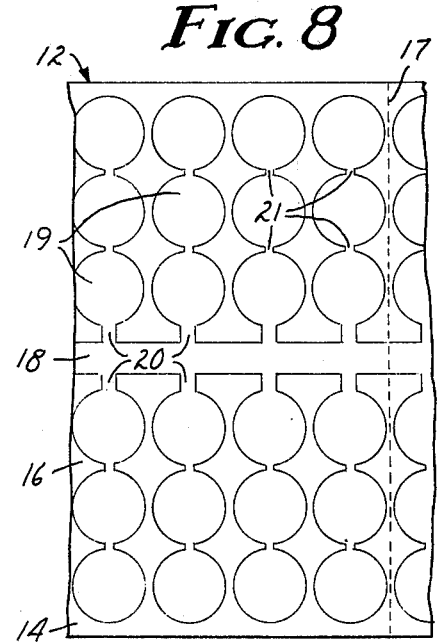
FIG. 8 is a plan view of a uninflated strip material for use in the system according to the present invention.

The strip material 12, best seen in FIGS. 6 and 8, comprises two thin flexible heat fusible films 14, each of which films 14 comprise a heat sealable thermoplastic material forming at least one surface of the film 14. The films 14 are positioned with their thermoplastic surfaces adjacent, and with adjacent portions of their thermoplastic surfaces in contact, and are fused together in discrete areas 16 to define a plurality of unfused adjacent surface areas in a pattern providing between the films 14 two rows of inflatable chambers 19, a passageway 18 extending the length of the strip material 12 between the rows of inflatable chambers 19, and an inlet opening 20 communicating between each of the chambers 19 and the passageway 18. Each chamber 19 also has two constricted chamber areas 21 dividing the chamber 19 into three generally circular portions. The constricted areas 21 afford transfer of air between the chamber portions when the chamber 19 is inflated and subsequently afford restricted movement of air between the chamber portions to provide a damping effect for the chamber portions during use of the inflated cushioning material. Each chamber 19 is generally elongate and oriented with its center line extending generally at a right angle with the center line of the passageway 18. Also the strip material 12 has spaced transverse perforations 17 between adjacent chambers 19 to afford separating portions of the inflated cushioning material.

The films 14 referred to herein may consist of a polyolefin such as polyethylene or polypropylene, or be a layered film (e.g. coated, laminated or co-extruded film) such as a polyester backed ethylene vinyl acetate copolymer, a polyvinylidene chloride coated polyethylene, a thermoplastic coated paper or a polyolefin coated polyester. The main requirement for the film is that a heat sealable material forming at least one of its surfaces will fuse to a mating surface to form an air tight seal under the influence of moderate pressure and heat, and that it has desired strength and gas barrier properties. A polyester film coated with an ethylene vinyl acetate copolymer (e.g. the film sold under the trademark "Scotchpak 113" by Minnesota Mining and Manufacturing Company) has been found to produce air cushions having a very high bursting strength, which may be particularly desirable for some applications; whereas a co-extruded film having polyethylene layers on both sides of a layer of vinylchloride-vinylidene chloride copolymer (e.g. the film sold under the trade name "Saranex 11" by Dow Chemical Company) is less expensive and has an adequate bursting strength and gas barrier for most air cushion applications.

Figure 9:
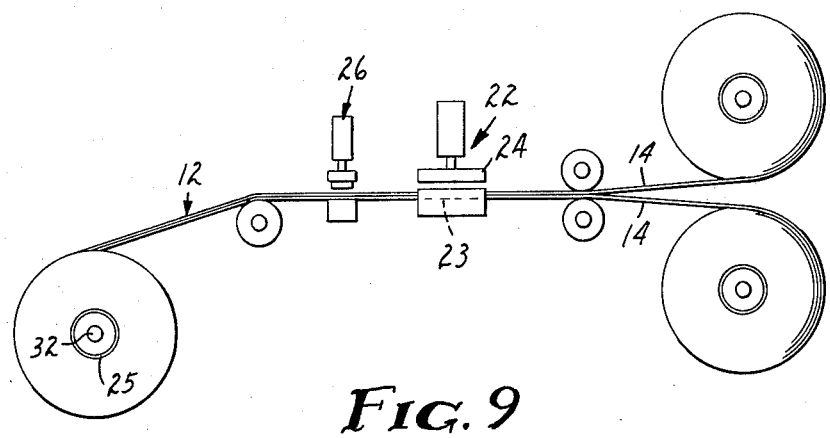
FIG. 9 is a schematic view of a device for forming the strip material of FIG. 8.

As is schematically illustrated in FIG. 9, the layered strip material 12 is prepared by feeding the films 14 along separate paths to a forming station 22. At the forming station 22 the films 14 may be supported on a planar surface 23 in face-to-face contact with their edges aligned, and the face of an electrically heated die 24 having raised ridges in the configuration of the discrete areas 16 to be fused between the films 14 may be pressed against the adjacent films 14 to fuse the films 14 together between stepwise advancements of the films 14. Alternatively the discrete areas 16 between the films 14 could be fused together between heated rotating members to afford continuous movement of the films 14, or by ultrasonic or induction means, or by the known process of infra-red black line sealing. After the forming station the strip material 12 passes through a perforating die 26 which forms the perforation 17 across the strip material 12 at spaced intervals along its length, and then is helically wound on a spool 25 for shipment to the site where the inflatable chambers 19 formed therein will be inflated and the inlet openings 20 sealed by the device 10. Alternately the station 22 can be adapted to permanently stretch the portions of the films 14 defining the chambers 19 so that shrinking of the strip material 12 will be reduced upon subsequent inflation of the chambers 19.

The device 10 for inflating and sealing the chambers 19 is illustrated in FIGS. 1 through 7. Briefly the device 10 includes means for defining a path for the strip material 12 through the device 10, means for propelling a portion of the strip material 12 along the path through the device 10; means along the path defining an inflation station for inflating the chambers 19 of the strip material 12; means along the path subsequent to the inflation station defining a heat sealing station for applying heat and pressure to seal the inlet openings 20 of the chambers 19 along a predetermined sealing path longitudinally of the strip material for each row of chambers 19; means for tensioning the strip material along the path through the inflation and heat sealing station to remove wrinkles from the films 14 across the inlet openings 20; and means for pressing the films 14 together along the predetermined sealing path and in an area on the side of the sealing path adjacent the chambers 19 both during the sealing of the inlet openings 20 at the inflation station and subsequent thereto while the sealed films 14 at the inlet openings 20 are cooled to prevent air pressure in the chambers 19 from rupturing the film along the sealed inlet openings 20 while the sealed inlet openings 20 are hot.

The means for defining the path for the strip material through the device comprise opposed slots 29 on a frame 30 for the device 10 in which a shaft 32 on the spool 25 supporting the wound strip material 12 is rotatably and removably supported to define an inlet end of the path. Means (not shown) are provided on the device 10 for frictionally retarding rotation of the shaft 32 in the slots 29 to restrict overrunning of the spool 25. From the spool 25 the strip material 12 extends first between a pair of nip rollers 34 fixed to shafts 35 rotatably mounted on the frame 30. From the nip rollers 34 the strip material 12 extends between an endless belt 44 and a wheel 40 fixed to a shaft 41 rotatably mounted on the frame 30 from a first end 37 to a second end 38 of a common path for a peripheral support surface 39 of the wheel 40 and a contact surface 43 on the belt 44, and then leaves the device at an outlet end of the path along a guide plate 45 positioned to separate the strip material from the wheel 40. The belt 44 is supported on a flanged guide roller 46, a guide roller 47, and a cylindrical tensioning roller 48. The guide rollers 46 and 47 are respectively fixed to shafts 49 and 50 rotatably mounted on the frame 30, whereas the tensioning roller 48 is rotatably mounted on a shaft 52 fixed at the ends of a pair of parallel bars 53. The ends of the bar 53 opposite the shaft 52 are pivotably mounted about the shaft 50 to afford pivotal movement of the tensioning roller 48 about the shaft 50. The tensioning roller 48 is biased to a position tensioning the belt 44 between the rollers 46, 47, and 48 and along the periphery of the wheel 40 by means comprising a pair of springs 55 coupled between the frame 30 and the bars 53.

The means for tensioning the strip material along the path through the heat sealing station is incorporated in the means for propelling a portion of the strip material 12 along the path. A gear reduced motor 56 coupled to a shaft 57 (FIG. 1) is rotatably mounted on the frame 30. A sprocket 58 (FIG. 3) is fixed to the shaft 57 and via a chain 59 drives a sprocket 60 fixed to the shaft 49 on which the flanged guide roller 46 is fixed and a sprocket 61 driving a shaft 62 which is rotatably mounted on and extends transverse of the frame 30. A sprocket 63 (FIG. 2) is fixed to the end of the shaft 62 opposite the sprocket 61 and drives a chain 64. The chain 64 extends around an idler sprocket 65 a sprocket 66 fixed to the shaft 41 to which the wheel 40 is fixed, and a sprocket 67 fixed to the shaft 35 of one of the nip rollers 34. Thus activation of the motor 56 drives the wheel 40, the belt 44 and one of the nip rollers 34. The drive components are selected so that for a given motor speed the contact surface 43 of the belt 44 is driven slightly faster than the peripheral surface of the driven nip roller 34 to tension the length of strip material 12 therebetween and along the belt 44 at the heat sealing station and the peripheral surface 39 of the wheel 40 drives at a rate slightly faster than the contact surface 43 of the belt 44 so that the peripheral surface 39 of the wheel 40 also tends to tension and smooth the portion of the strip material 12 positioned along the belt 44 at the heat sealing station.

The means for defining the inflation station comprise a nozzle 69 at the end of a generally S-shaped tube 70 which extends through a circumferential groove 71 around the wheel 40. The tube 70 is coupled to a regulated source of air under pressure (not shown) via an air line 73 and a bore through a heat sink block 90 (the purpose of which block 90 will be explained later). Semi-circular gussets 74 are welded to the concave side surfaces of the tube 70 to provide support for the nozzle 69. The nozzle 69 is a generally straight hollow cylindrical end portion of the tube 70 positioned to extend centrally along the passageway 18 of the length of the strip material 12 positioned between the nip rollers 34 and the wheel 40. The nozzle 69 has an outside diameter just slightly smaller than the inside diameter of the passageway 18, an open terminal end 75 through which air passes into the strip material 12, and may have a plurality of said openings 76. The nip rollers 34 press the films 14 of the strip material 12 together across the passageway 18 and provide means for blocking the flow of air from the nozzle 69 through the passageway 18 within a predetermined distance from the end 75 of the nozzle 69 so that the air will enter the inlet openings 20 of the chambers 19 between the nozzle 69 and the nip rollers 34 and inflate the chambers 19. A knife blade 78 with a sharpened edge 79 positioned between the end 75 of the nozzle 69 and the outlet end of the path provides means for opening or severing one of the films 14 to afford movement of the strip material 12 over the nozzle 69. Severing could alternatively be provided by a score wheel positioned to rotate against the surface of the nozzle 69.

The means defining the heat sealing station for applying heat and pressure to seal off the inlet openings 20 of the chambers 19 comprise the surfaces 39 and 43 of the wheel 40 and belt 44 adjacent the first end 37 of their common path and the spring 55 which biases the contact surface 43 toward the peripheral surface 39 to press together the films portions defining the inlet openings 20 on the portion of the strip material 12 therebetween. A heated shoe 81 having parallel rails 82 with curved surfaces is positioned to engage the belt 44 on its surface opposite the contact surface 43 over the inlet openings 20 to the chambers 19 inflated by the nozzle 69 and apply heat to fuse the strip material 12 through the belt 44. The belt 44 is of stainless steel and has a coating, as of Teflon, defining its contact surface 43 so that the contact surface 43 does not adhere to the strip material 12 when it has again cooled after the sealing of the films 14. A thermostatically regulated electrical heating element 83 (FIG. 7) is mounted in and heats the shoe 81 to a desired temperature (e.g. 150° C). Sufficient heat to fuse the films 14 together will only be transferred to the strip material 12 in the areas over which the contact surfaces of the rails 82 pass, and each of the rails 82 is positioned to define the predetermined sealing path along which the inlet openings 20 of one of the two aligned rows of chambers 19 will be sealed as the strip material 12 is driven through the device 10.

The heated shoe 81 is pivotably mounted between the ends of a pair of parallel arms 84. The arms 84 are centrally pivoted at pins 85 on the frame 30 and are biased to move the rails 82 into firm engagement with the belt 44 by a spring 86 coupled between a bar 87 joining the ends of the arms 84 opposite the shoe 81 and the frame 30. One of the arms 84 pivotably supports a hook 88 adapted to engage a plate-like portion 89 of the frame 30 and retain the arms 84 in a position with the heated shoe 81 spaced from the belt 44 when the arms 84 are moved to that position against the bias of the spring 86, as is desirable to prevent over heating of the films 14 when the drive means for the strip material 12 is not operating.

Figure 7:
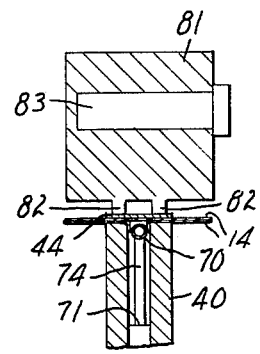
FIG. 7 is a sectional view taken approximately along line 7—7 of FIG. 5.

The means for pressing the films 14 together along the predetermined sealing path and on the side of the sealing path adjacent the chambers 19 both during the sealing of the inlet openings 20 and subsequently while the sealed films 14 at the inlet openings 20 are cooled, comprise the surfaces 39 and 43 of the wheel 40 and belt 44 and the spring 55 which biases the contact surface 43 of the belt 44 toward the peripheral surface 39 of the wheel 40. As is best seen in FIGS. 6 and 7, the belt 44 and wheel 40 have sufficient width that they extend beyond both side edges of the rails 82 (e.g. by about 0.4 centimeter), so that the extending portions of the tensioned belt 44 and wheel 40 press together portions of the films 14 defining the inflated chambers 19 or the portions of the inlet openings 20 adjacent the inflated chambers 19 and restrict air pressure in the inflated chambers 19 from rupturing the softened films 14 during the application of heat thereto through the belt 44. After the moving wheel 40 and belt 44 move the fused strip material 12 from beneath the heated shoe 81, they maintain the films 14 together while their newly fused areas are cooled. Such cooling is facilitated by the finned heat sink block 90 mounted on the frame 30 which draws heat from the fused films 14 through the belt 44 adjacent the second end 38 of the common path for the belt 44 and the peripheral surface 39 of the wheel 40. The heat sink block 90 is of black anodized aluminum for efficient heat disposition, is pivotably mounted on the frame 30 so that the weight of the block 90 will bias it into engagement with the belt 44, and has a brass facing sheet contacting the belt to provide the needed lubricity therebetween. The air line 73 connected to the regulated source of air under pressure is coupled to the tube 70 through the bore in the block 90 so that the expanded air passing through the line 73 and tube 70 will help cool the block 90.

Figure 10:
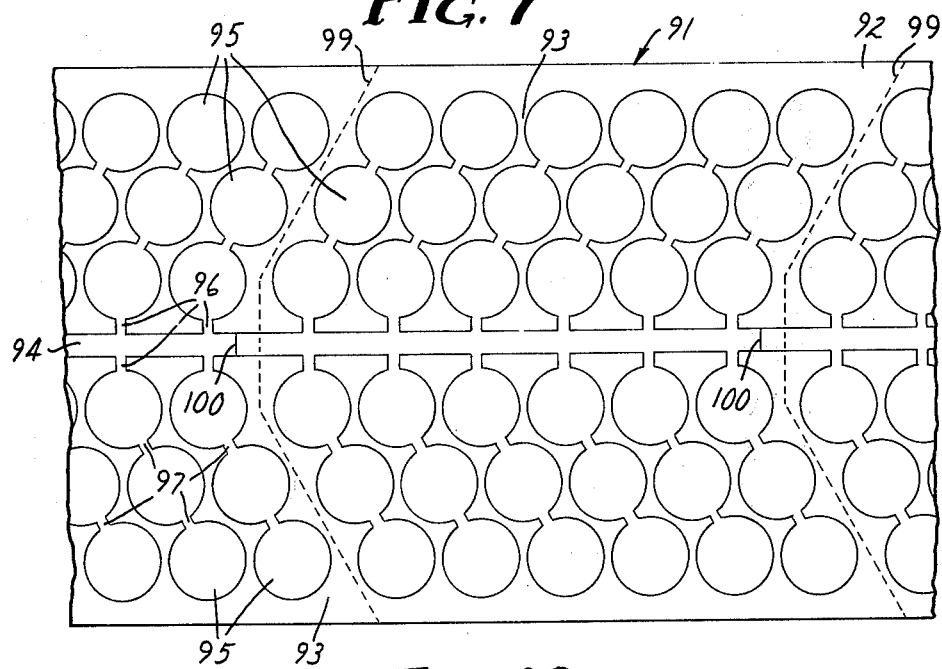
FIG. 10 is a plan view of an alternate embodiment of an uninflated strip material for use in the system according to the present invention.

FIG. 10 illustrates an alternate embodiment of a strip material for use in the device 10 generally designated by the numeral 91. Like the strip material 12, the strip material 91 comprises two thin flexible heat fusible films 92 each of which films 92 comprise a heat sealable thermoplastic material forming at least one of its surfaces and may be of any one of the materials listed for the films 14. The films 92 are positioned with their thermoplastic surfaces adjacent, and with adjacent portions of their thermoplastic surfaces in contact, and are fused together in discrete areas 93 by means such as are illustrated in FIG. 9 to define a plurality of adjacent unfused adjacent surface areas in a pattern providing two rows of inflatable chambers 95, and a passageway 94 extending the length of the strip material 91 between the rows of chambers 95, with each of the chambers 95 having a inlet opening 96 communicating with the passageway 94. Like the chambers 19, each chamber 95 is generally elongate and has two constricted chamber areas 97 which divide the chamber 95 into three portions; but unlike the strip material 12, the center lines of the chambers 95 extend at an acute angle of about 60 degrees with the center line of the passageway 94. This configuration allows the chambers 95 to be closely spaced and insures that rupturing a single chamber 95 will not cause an uninflated portion of cushioning material that extends at a right angle to its edge which is helpful in providing maximum protection for items around which the cushioning material is wrapped. Also the strip material 91 has spaced transverse perforations 99 which afford separating portions of the inflated cushioning material.

Also, as illustrated in FIG. 10, the strip material 91 may include means for blocking flow of air at predetermined positions along the passageway 94, which, when the strip material 91 is positioned along the path through the device 10, blocks the flow of air from the nozzle through the passageway within a predetermined distance from the nozzle independent of the nip rollers 34. The portions of the films 92 defining the passageway 94 are sealed together transverse of the passageway in areas 100 at spaced intervals along the passageway 94. The areas 100 are not sealed with the amount of heat and/or pressure used to seal the areas 93, but are sealed to provide sufficient adhesion between the films 92 so that the films 92 will remain adhered to effectively block air passing through the passageway 94. Upon movement of the passageway 94 over the nozzle 69, however, the areas 100 will peel apart under the separating force of the terminal end 75 of the nozzle 69. If desired, similar spaced peelably sealed areas could also be provided in the strip material 12 illustrated in FIG. 8.

For operation the motor 56 is actuated to drive the belt 44, the wheel 40 and one of the nip rollers 34 to withdraw the strip material 12 from the spool 25 and propel it through the device 10 over the nozzle 69 while tensioning it at the inflation and heat sealing stations between the nip rollers 34, belt 44 and wheel 40 by differential speeds of the driven members as has previously been explained. The source of air under pressure is coupled to the air line 73, and air flows into the chambers 19 of the tensioned length of strip material 12 through the nozzle 69, central passageway 18 and inlet openings 20 therein, with the nip rollers 34 pinching the strip material 12 to block movement of the air in the passageway 18 causing the air from the nozzle 69 to enter the inlet openings 20 and inflate the chambers 19 between the nozzle 69 and nip rollers 34. The edges of the strip material 12 are not constrained so that any transverse shrinkage that occurs in the strip material 12 during inflation of the chambers 19 does not affect the operation of the device 10. From the inflation station 27 the inflated chambers 19 move between the belt 44 and wheel 40 so that their surfaces 43 and 39 press together the films 14 at and adjacent the inlet openings 20 of the inflated chambers 19. Subsequently each inlet opening 20 moves under one rail 82 of the heated shoe 81, which supplies heat to fuse the inlet opening 20 through the belt 44. The rail 82 is more narrow than the contact surface 43 of the belt 44 and support surface 39 of the wheel 40 and the portions of those surfaces 43 and 39 adjacent the rails 82 press the films 14 together under the influence of the spring 86 and prevent air pressure in the chambers 19 from rupturing the heated and softened films 14 as the inlet openings 20 are fused shut and while the films 14 cool after they move out from under the heated shoe 81 and pass under the heat sink block 90 which draws heat from the belt 44 and films 14. The strip material 12 then passes from between the belt 44 and wheel 40 as inflated cushioning material ready for use.

We claim:

1. A device adapted for inflating and sealing a strip material comprising two thin elongate flexible films, each film comprising a heat sealable thermoplastic material forming at least one surface of the film, said films being positioned with their thermoplastic surfaces adjacent and with adjacent portions of their thermoplastic surfaces in face-to-face contact and being fused together in discrete areas to define a plurality of unsealed adjacent surface areas in a pattern providing two rows of inflatable chambers and a passageway between the rows extending the length of the strip, with each of said chambers having an inlet opening communicating with the passageway, wherein said device comprises:
   means adapted to defining a strip path for a said strip material through said device extending from a inlet to an outlet end;
   means along said strip path adapted for defining an inflation station for the uninflated chambers of a said strip material comprising an elongate nozzle having a terminal end portion directed toward the inlet end of said path and positioned to afford movement of the portion of the strip material along said strip path over said nozzle with said nozzle in its passageway;
   means spaced from the terminal end of said nozzle toward the outlet end of said strip path adapted for opening one of the films of a said strip material along its passageway to afford movement of the strip material along said strip path;
   means along the strip path subsequent to the inflation station adapted for applying heat to seal the inlet openings of a said strip material along predetermined sealing paths longitudinally of the strip material;
   tensioning means adapted for tensioning a said strip material along the strip path through said means for applying heat, said tensioning means being adapted to remove wrinkles across the inlet openings;
   means along said strip path adapted for pressing together the films of a said strip material along the sealing paths and in areas on the sides of the sealing paths adjacent the rows of chambers from a first position in advance of said means for applying heat to a second position between said means for applying heat and the outlet end of said strip path; and
   means adapted for affording cooling of sealed inlet openings on a said strip material between said means for applying heat and said second position.

2. A device according to claim 1 further including means adapted for blocking flow of gas from said nozzle through the passageway of a said strip material along said strip path within a predetermined distance from said nozzle.

3. A device according to claim 1 further including means adapted for driving a said strip material along said strip path through said device, and wherein said means adapted for driving provides said means adapted for tensioning.

4. A device according to claim 1 wherein said means for defining said path further includes a pair of nip rollers adapted to receive a said strip material therebetween and spaced a predetermined distance from the terminal end of said nozzle toward the inlet end of said path, said nip rollers being adapted for engaging and pressing together the films at the passageway of a said strip material to block the flow of gas from said nozzle through said passageway.

5. A device according to claim 1 wherein:
   said means adapted for pressing comprises:
      means for defining a support surface on one side of said strip path adapted to support a said strip material along the sealing paths and in the areas on the sides of the sealing paths adjacent the rows of chambers from said first position to said second position;
      an endless belt having a contact surface adapted to releasably engage the surface of a said strip material and having a width adapted to engage a said strip material along the sealing paths and in the areas on the sides of the sealing paths adjacent the rows of chambers;
      means for supporting said endless belt for movement along a belt path including a belt path portion extending from said first position to said second position along said path on the side of said strip path opposite said one side; and
      means for biasing the contact surface on the portion of said endless belt along said belt path portion into intimate engagement with a said strip material along said strip path between said first and second positions.

6. A device according to claim 5 wherein said means for applying heat comprises:
   a shoe adjacent said first position slidably engaging the surface of said belt opposite said contact surface; and
   means for heating said shoe to apply heat along said sealing paths through said belt.

7. A device according to claim 6 wherein said means for affording cooling comprises a heat sink block slidably engaging the surface of said belt opposite said contact surface adjacent said second position to draw heat from the fused films of a said strip material through said belt.

8. A device according to claim 5 wherein said means for defining a support surface is provided by a peripheral surface of a wheel, said means for supporting said endless belt guides said belt around a portion of the peripheral surface of said wheel from said first position to said second position, and said means for biasing the contact surface of said belt comprises means for tensioning said belt against the periphery of said wheel.

9. A device according to claim 5 wherein said means for defining said path further includes a pair of nip rollers adapted to receive a said strip material therebetween and spaced a predetermined distance from the terminal end of said nozzle toward the inlet end of said path, said nip rollers being adapted for engaging and pressing together the films at the passageway of a said strip material to block the flow of gas from said nozzle through said passageway, and said device further comprises means adapted for propelling said strip material through said device, including means for driving said belt to move said contact surface at a first rate, means for driving said wheel to move said support surface at a rate slightly greater than said first rate, and means for driving one of said nip rollers to move its peripheral surface at a rate slightly slower than said first rate, said differential driving rates providing said means adapted for tensioning.

10. A system for affording on site inflation of cushioning material, said system comprising:
   a strip material comprising two thin elongate flexible films, each film comprising a heat sealable thermoplastic material forming at least one surface of the film, said films being positioned with their thermoplastic surfaces adjacent and with adjacent portions of their thermoplastic surfaces in face-to-face contact and being fused together in discrete areas to define a plurality of unsealed adjacent surface areas in a pattern comprising two rows of inflatable chambers and a passageway between the rows extending the length of the strip, with each of said chambers having an inlet opening communicating with the passageway;
   a device for inflating and sealing said strip material comprising:
      means for defining a strip path for said strip material through the device;
      means along the strip path defining an inflation station for inflating the chambers of said strip material with gas;
      means along the path subsequent to the inflation station defining a heat sealing station for applying heat and pressure to seal the inlet openings of said strip material along a predetermined sealing path longitudinal of the strip material;
      means for tensioning a said strip material along the strip path through said heat sealing station to remove wrinkles across the inlet openings; and
      means for pressing together the films of said strip material along the sealing path and in an area on the side of the sealing path adjacent the row of chambers both during the sealing of the inlet openings and subsequent thereto while the films along the sealing path are cooled to prevent gas pressure in the chambers from rupturing heated film along the sealing path.

11. A system according to claim 10 further including means for blocking flow of gas from said nozzle through the passageway of said strip material along said strip path within a predetermined distance from said nozzle.

12. A system according to claim 10 further including means for driving said strip material along said strip path through said device, and wherein said means for driving provides said means for tensioning.

13. A system according to claim 10 wherein:
   said strip path through said device extends from an inlet to an outlet end;
   said inflation station comprises an elongate nozzle having a terminal end portion directed toward the inlet end of said strip path and positioned to afford movement of the portion of the strip material along said strip path over said nozzle with said nozzle in its passageway;
   said device further includes means spaced from the terminal end of said nozzle toward the outlet end of said strip path adapted for opening one of the films of said strip material along its passageway to afford movement of the strip material along said strip path;
   said means for pressing presses the films together from a first position to a second position along said strip path between the terminal end of said nozzle and said outlet end of said strip path;
   said means for applying heat and pressure is positioned adjacent said first position; and
   said device further includes means for affording cooling of sealed inlet openings on said strip material adjacent said second position.

14. A device according to claim 13 wherein:
   said means for pressing comprises:
      means for defining a support surface on one side of said strip path for supporting said strip material along the sealing paths and in the areas on the sides of the sealing paths adjacent the rows of chambers from said first to said second position;
      an endless belt having a contact surface adapted to releasably engage the surface of said strip material and having a width adapted to engage a said strip material along the sealing paths and in the areas on the sides of the sealing paths adjacent the rows of chambers;
      means for supporting said endless belt for movement along a belt path including a belt path portion extending from said first position to said second position along said path on the side of said strip path opposite said first side; and
      means for biasing the contact surface on the portion of said endless belt along said belt path portion into intimate engagement with said strip material along said strip path between said first and second positions; and
   said means for applying heat comprises:
      a shoe adjacent said first position slidably engaging the surface of said belt opposite said contact surface; and
      means for heating said shoe to apply heat along said sealing paths through said belt.

* * * * *

UNITED STATES PATENT AND TRADEMARK OFFICE
CERTIFICATE OF CORRECTION

PATENT NO. : 4,017,351
DATED : April 12, 1977
INVENTOR(S) : Curtis L. Larson and John R. Ward It is certified that error appears in the above-identified patent and that said Letters Patent are hereby corrected as shown below:

Column 6, line 38, change "said" to -- side --.

In the Claims:

Column 9, line 52, change "longitudinally" to -- longitudinal --.

Signed and Sealed this

Twenty-eighth Day of June 1977

[SEAL]

Attest:

RUTH C. MASON
Attesting Officer

C. MARSHALL DANN
Commissioner of Patents and Trademarks